April 17, 1934.　　　C. F. KETTERING　　　1,955,192
REFRIGERATING APPARATUS
Filed Dec. 30, 1931　　　2 Sheets-Sheet 1
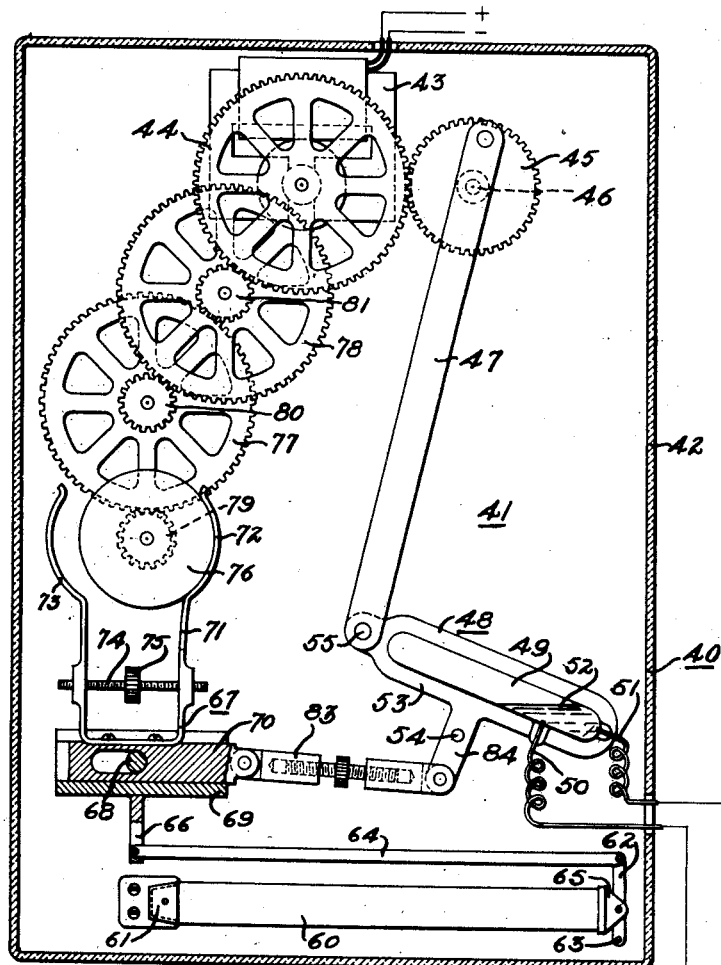
Fig.1
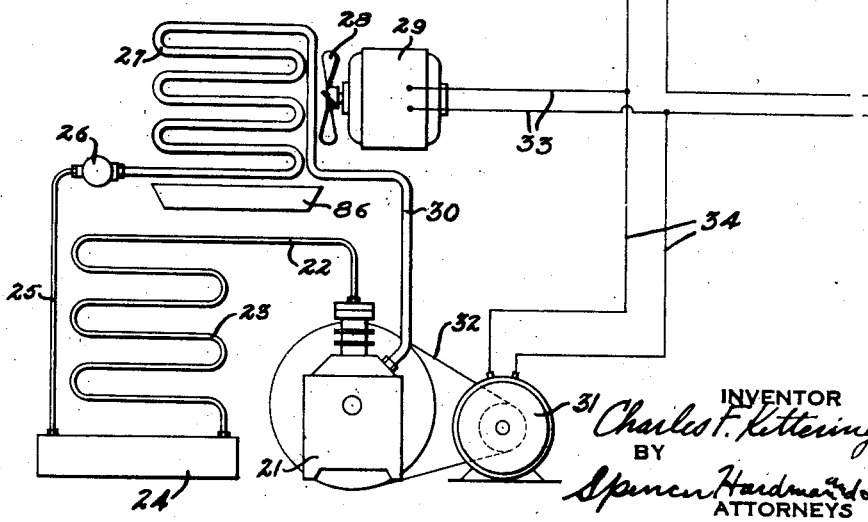
INVENTOR
Charles F. Kettering
BY
Spencer Hardman and Fehr
ATTORNEYS April 17, 1934.                C. F. KETTERING                1,955,192
                            REFRIGERATING APPARATUS
                  Filed Dec. 30, 1931        2 Sheets-Sheet 2
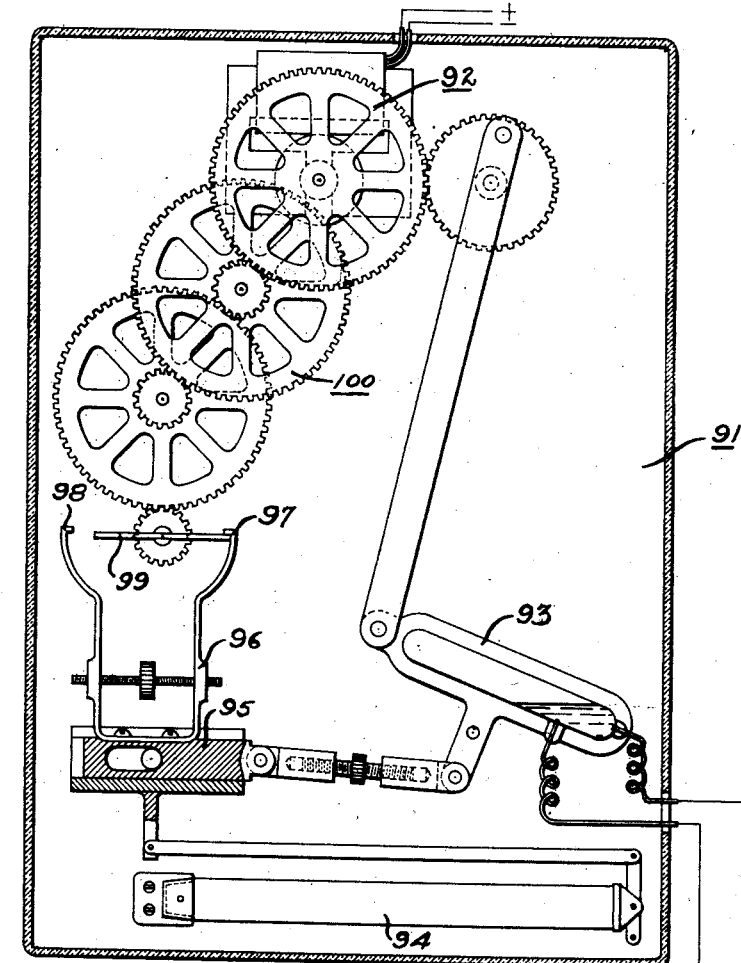
Fig.2
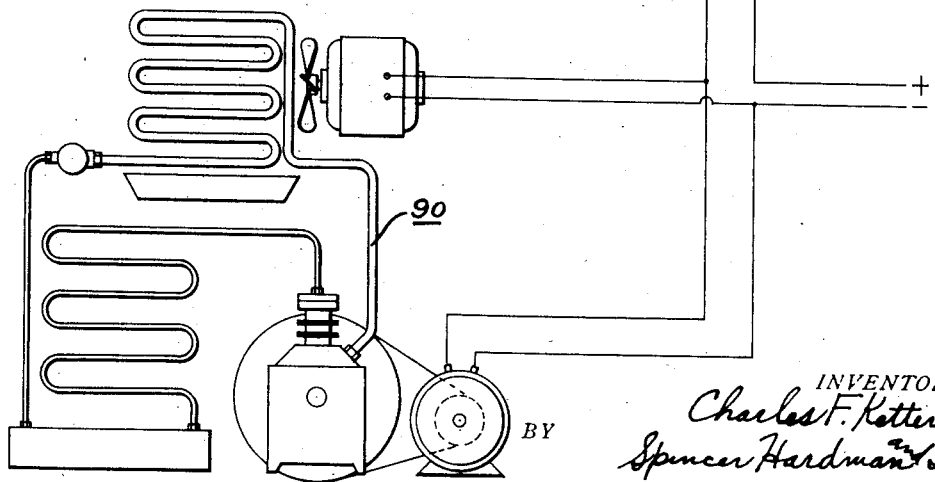
INVENTOR
Charles F. Kettering
Spencer Hardman
ATTORNEYS Patented Apr. 17, 1934

1,955,192

UNITED STATES PATENT OFFICE 1,955,192

REFRIGERATING APPARATUS

Charles Frank Kettering, Dayton, Ohio, assignor to Frigidaire Corporation, Dayton, Ohio, a corporation of Delaware Application December 30, 1931, Serial No. 583,879

12 Claims. (Cl. 200—52)

This invention relates to refrigerating apparatus and more particularly to a hygrostat for controlling the operation of a refrigerant dehumidifying apparatus.

The objects of my invention include: the provision of an improved hygrostat which is simple in construction, which may be manufactured at a low cost, and which is actuated by a power mechanism; the provision of an improved power actuated switch mechanism, and the provision of an improved mechanical device.

Further objects and advantages of the present invention will be apparent from the following description, reference being had to the accompanying drawings, wherein a preferred form of the present invention is clearly shown.

In the drawings:

Fig. 1 is an elevation of my improved hygrostat together with a form of dehumidifying refrigerant apparatus, and Fig. 2 is an elevation of a modified form of my improved hygrostat together with a form of refrigerant dehumidifying apparatus.

Referring to the drawings, and more particularly to Fig. 1, there is disclosed, for illustrative purposes, a refrigerant dehumidifying apparatus including a compressor 21 for compressing the refrigerant and for forwarding the compressed refrigerant through a conduit 22 to a condenser 23 where the refrigerant is condensed. The refrigerant condensed in the condenser 23 is collected in a receiver 24 located below the condenser 23. The liquefied refrigerant collected in the receiver 24 is forwarded through a conduit 25 to an expansion valve 26 of a suitable type. The expansion valve 26 allows the refrigerant to expand and pass into an evaporator 27 where the refrigerant evaporates and cools the air which is blown over the evaporator by a fan 28 which is driven by an electric motor 29. The evaporated refrigerant is returned to the compressor through the return conduit 30. The compressor 21 is driven by an electric motor 31 through the pulley and belt means 32. The electric motors 29 and 31 are supplied with electricity through the electric wires 33 and 34. The operation of the electric motors is controlled by a hygrostat 40 which controls the supply of electricity to the electric motors 29 and 31.

The hygrostat 40 is provided with a suitable base member 41 and a suitable enclosure 42 for enclosing the mechanism incorporated in the hygrostat 40. Mounted upon the base 41 is a clock motor 43 preferably of the self-starting synchronous type which is provided with a driving gear 44. This electric clock motor 43 remains connected at all times to a suitable source of electric energy. Instead of employing an electric clock motor, a spring type of clock motor, or any other suitable power device may be used. The driving gear 44 drives a second gear 45, which is rotatably mounted upon a shaft 46, which has its end mounted in the base 41. A connecting rod 47 connects the gear 45 to a switch mechanism 48 which is preferably of the mercury tube type comprising a sealed glass tube 49 which has at one end a pair of electric wires 50 and 51 extending through the walls thereof, but which are separated from each other. A small amount of mercury 52 is inserted into the glass tube 49 before it is sealed. The glass mercury tube 49 is supported upon a T-shaped frame 53 which is mounted upon a pivot pin 54 which is supported by the base 41. The T-shaped frame 53 has one end connected to the connecting rod 47 by a pin 55.

A hygrostatic element 60, preferably of a material such as wood which swells and lengthens upon an increase of humidty, and which shortens upon a decrease of atmospheric humidity, is preferably employed to control the operation of the clock motor 43 to control the switch mechanism 48. One end of the hygrostatic element 60 is fixed to the base 41 by a bracket 61. At the other end of the hygrostatic element 60 a cap member 65 is seated thereon and pivotally connected to an intermediate portion of a lever follower 62 having one end 63 pivotally connected to the base 41 and having its opposite end connected to a connecting rod 64. The other end of the connecting rod 64 is connected to an arm 66 of a braking mechanism, generally designated by the reference character 67, which is mounted upon a pivot pin 68 which in turn is fixed to the base 41 for pivotally supporting the braking mechanism 67. The pivot pin 68 pivotally supports a slideway 69 from which the arm 66 depends. A slide 70 is provided which is connected by means of an adjustable link 83 which depends from the T-shaped member 53. This slide 70 is slidably mounted in the pivotally mounted slideway 69 and is caused to slide horizontally back and forth in the slideway 69 upon the movement of the switch mechanism 48. Upon the upper surface of the slide 70 is a U-shaped braking mechanism 71. This braking member 71 is provided with two brake shoe portions 72 and 73 which are formed from the upper portions of its sides. A left and right threaded shaft 74 is provided with a knurled thumb screw 75 at its center portion for adjusting the brake shoes 72 and 73. The brake shoes 72 and 73 cooperate with a brake drum 76 which is connected to the driving gear 44 by the gear train including the large gears 77 and 78 rotatably mounted upon pins which are fixed within the base 41, which gears mesh with the pinions 79, 80 and 81 so as to drive the brake drum 76 at a relatively high speed with reference to the driving gear 44. Instead of being mounted upon the shaft of the driving gear 44 to drive the driving gear directly, the clock motor 43 may be placed so as to drive directly one of the pinion gears 79, 80 or 81 in order to take advantage of the high rotative speed of the clock motor, if desired. The slide 70 is connected by means of an adjustable link 83 to the arm 84 which depends from the T-shaped member 53.

The operation is as follows: As shown, the mercury tube 49 is tilted so that the mercury 52 within the tube has run down to the end of the tube where the electric wires 50 and 51 project into the tube and has completed the circuit so that the electric current coming from the source of supply can pass from the wire 51 through the mercury 52 to the wire 50 so as to supply electric current to the electric motor 29 and the electric motor 31 to start the refrigerant dehumidifying system into operation. The fan 28 then blows air over the evaporator 27, thus cooling the air below its dew point and causing moisture to collect upon the evaporator 27 and to drip into the trough 86 which is provided for collecting the drip from the evaporator. The compressor 21 is operated by the electric motor 31 concurrently with the fan 28 and the motor 29 and supplies liquid refrigerant to and withdraws gaseous refrigerant from the evaporator 24 for cooling and dehumidifying the air which is blown over the evaporator 27 by the fan 28.

By the operation of this dehumidifying apparatus, the air is cooled and its moisture content reduced so that the hygroscopic element 60 loses some of its moisture and contracts to pull the lever 62 and the connecting rod 64 to the left, causing the braking mechanism 67 to swing slightly about the pivot 68 in a clockwise direction and thereby to release the brake shoe 72 from the brake drum 76 and in this manner the electric motor 43 is allowed to operate. This causes the train of gears connecting the driving gear 44 and the brake drum 76 to move and also causes the gear 45 to be rotated. By the rotation of the gear 45, the connecting rod 47 is moved downwardly during the first half revolution and this tilts a mercury tube 45 in the opposite direction so that the mercury 52 runs into the opposite ends of the tube and breaks the electric circuit. At the same time, the adjustable link 83 pulls the slide 70 to the right and applies the brake shoe 73 to the braking drum 76 so as to stop the braking drum 76, the train of gears, and the clock motor 43. Should the room again become humid, the hygroscopic element 60 will expand and pivot the braking mechanism 67 counter-clockwise a slight amount to release the braking shoe 73 from the drum and allow the clock motor 43 to rotate which will tilt the mercury tube 49 back to the position shown in the figure, at which time the movement will be stopped by reason of the fact that the arm 84 and the adjustable link will move the slide 70 to the left and cause the application of the brake shoe 72 to the brake drum 76.

Obviously if an electric type of clock motor is used, it must be so built that it is self-starting and that it must be designed with a high factor of safety so that it may be made constantly across the line whether rotating or not since the motor in my improved hygrostat is not operating the greater part of the time. Of course, it is not necessary that an electric clock motor be used but any suitable type of electric motor, spring motor or other power device may be employed.

In the modification shown in Fig. 2 a similar dehumidifying device or system 90 may be used and controlled by a hygrostat 91 which is similarly provided with a power mechanism 92 for driving a switch mechanism 93 and provided with a hygroscopic element 94 which controls the operation of a detent mechanism 95 having a U-shaped member 96 provided with bent-in prongs 97 and 98 which are adapted to engage a rotatable detent member 99 which is connected to the gear train 100 of the power mechanism 92 in a similar manner to that in which the brake drum 76 of Fig. 1 is connected to the driving gear 44 and the clock motor 43 of Fig. 1.

While the form of embodiment of the invention as herein disclosed constitutes a preferred form, it is to be understood that other forms might be adopted, all coming within the scope of the claims which follow.

What is claimed is as follows:

1. A hygrostat including a hygroscopic element, a switch mechanism, power means for operating said switch mechanism, means responsive to changes in a dimension of said hygroscopic element for controlling the operation of said power means, and means connecting said switch mechanism and said responsive means for providing additional movement to said responsive means.

2. A hygrostat including a hygroscopic element, a switch mechanism having a movable member movable to open circuit and closed circuit positions, power means for moving said movable member from open circuit position to closed circuit position and from closed circuit position to open circuit position, means responsive to a change in a dimension of said hygroscopic element for controlling the starting of said power means, and means responsive to the movement of the movable member for controlling the stopping of said power means.

3. A hygrostat including a hygroscopic element, a switch mechanism having a movable member movable to open circuit and closed circuit positions, power means for moving said movable member from open circuit position to closed circuit position and from closed circuit position to open circuit position, a detent means for stopping the operation of the power means, means responsive to a change in the dimension of said hygroscopic element for releasing the detent means, and means responsive to the movement of said movable member for engaging said detent means.

4. A hygrostat including a hygroscopic element, a switch mechanism having a movable member movable to open circuit and closed circuit positions, power means for moving said movable member from open circuit position and from closed circuit position to open circuit position, a braking means for stopping the operation of the power means, means responsive to a change in the dimension of said hygroscopic element for releasing the braking means, and means responsive to the movement of said movable member for engaging said braking means.

5. A control means including a switch mechanism having a member movable to open circuit and closed circuit positions, power means for moving said member from open circuit position to closed circuit position and from closed circuit position to open circuit position, an element having the property of changing a dimension in response to changes in the surrounding atmosphere, means responsive to a change in dimension of said element for controlling the starting of the power means, and means responsive to the movement of said movable member for controlling the stopping of said power means.

6. A control means including a switch mechanism having a member movable to open circuit and closed circuit positions, a rotary power means, means including a connecting rod for connecting said rotary power means to said movable member for moving said movable member from open circuit position to closed circuit position and from closed circuit position to open circuit position, an element having the property of changing a dimension in response to a change in the surrounding atmosphere, means responsive to a change in dimension of said element for controlling the starting of said power means, and a link mechanism connecting said movable member and said means responsive to a change in dimension of said element for controlling the stopping of said power means.

7. A control apparatus including a control member movable from one position to another, power means for moving the control member from one position to another, said power means having a rotatable member connected thereto, an expansible member and engaging means mechanically connected to the expansible member for releasing the rotatable member to start the power means, and means mechanically connected to the control member for moving the engaging means into engagement with the rotatable member to stop the power means.

8. A control apparatus including a control member movable from one position to another, power means for moving the control member from one position to another, said power means having a rotatable member connected thereto, an expansible member and engaging means mechanically connected to the expansible member for releasing the rotatable member to start the power means, said engaging means extending on opposite sides of the rotatable member, and means connected to the control member for moving one side of the control member into engagement with the rotatable member after the other side has been disengaged by the expansible member.

9. A control apparatus including an expansible element, a switch mechanism having a movable member movable to open circuit and closed circuit positions, power means for moving said movable member from open circuit position to closed circuit position and from closed circuit position to open circuit position, mechanical means responsive to the expansion of said expansible member for controlling the starting of the power means, and mechanical means responsive to the movement of the movable member for controlling the stopping of said power means.

10. A control apparatus including an expansible element, a switch mechanism having a movable member movable to open circuit and closed circuit positions, power means for moving said movable member from open circuit position to closed circuit position and from closed circuit position to open circuit position, a detent means for stopping the operation of the power means, mechanical means responsive to the expansion of said expansible element for releasing the detent means, mechanical means responsive to the movement of said movable member for engaging the detent means, and means for adjusting the detent means.

11. A control apparatus including a humidity responsive element, an electric circuit controlling means having a movable member movable to open circuit and closed circuit positions, power means electrically connected to an electric circuit and energized thereby for moving said movable member from one position to another and mechanical means mechanically connected to said humidity responsive element and controlled thereby for controlling the operation of the power means.

12. A control apparatus including a humidity responsive wooden stick, an electric circuit controlling means having a movable member movable to open circuit and closed circuit position, power means electrically energized for moving said movable member from one position to another, and mechanical means mechanically connected to said wooden stick and controlled thereby for controlling the operation of the power means.

CHARLES FRANK KETTERING.